United States Patent
Yuan

(10) Patent No.: US 12,263,878 B2
(45) Date of Patent: Apr. 1, 2025

(54) CARRIER WITH PROTECTIVE COVER ON CANOPY ROD

(71) Applicant: WONDERLAND SWITZERLAND AG, Steinhausen (CH)

(72) Inventor: Jialiang Yuan, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 15 days.

(21) Appl. No.: 17/981,094

(22) Filed: Nov. 4, 2022

(65) Prior Publication Data
US 2023/0148379 A1    May 11, 2023

(30) Foreign Application Priority Data

Nov. 5, 2021    (CN) .......................... 202111305409.0

(51) Int. Cl.
*B62B 9/14*    (2006.01)
*B62B 9/20*    (2006.01)

(52) U.S. Cl.
CPC ................. *B62B 9/142* (2013.01); *B62B 9/20* (2013.01)

(58) Field of Classification Search
CPC .. B62B 9/142; B62B 9/20; B62B 9/14; B62B 9/00; B62B 7/083; B62B 7/00
See application file for complete search history.

(56) References Cited

U.S. PATENT DOCUMENTS

| | | | | |
|---|---|---|---|---|
| 4,641,879 A | * | 2/1987 | Kassai | ...................... B62B 9/14 135/88.02 |
| 5,190,390 A | * | 3/1993 | Ming-Tai | .................. B62B 9/14 16/334 |
| 5,722,594 A | * | 3/1998 | Farr | ....................... B62B 3/008 280/DIG. 3 |

(Continued)

FOREIGN PATENT DOCUMENTS

| | | |
|---|---|---|
| CN | 201800747 U | 4/2011 |
| CN | 105270460 A | 1/2016 |

(Continued)

OTHER PUBLICATIONS

Taiwan 1st Office Action issued in corresponding Taiwan Application No. 111141982, dated Sep. 12, 2023, pp. 1-12.

(Continued)

*Primary Examiner* — James M Dolak
(74) *Attorney, Agent, or Firm* — HAUPTMAN HAM, LLP

(57) ABSTRACT

A carrier is provided in the present disclosure. The carrier includes a frame, and the frame includes a lower handle portion, an upper handle portion, a canopy rod, and a protective cover. The lower handle portion and the upper handle portion form parts of the frame, and a lower end of the upper handle portion is connected to an upper end of the lower handle portion, such that the upper handle portion is pivotable between an unfolded position relative to the lower handle portion and a collapsed position. The canopy rod is pivotally connected to the lower end of the upper handle (Continued)

portion, and is pivotable between an unfolded position and a folded position. The protective cover is sleeved on the canopy rod. When the canopy rod is in its folded position, the protective cover is located between the canopy rod and the lower handle portion.

10 Claims, 12 Drawing Sheets

(56) References Cited

U.S. PATENT DOCUMENTS

| | | | | |
|---|---|---|---|---|
| 6,155,628 | A * | 12/2000 | Williams | B62B 9/142 |
| | | | | 280/47.38 |
| 6,402,225 | B1 * | 6/2002 | Hsia | B62B 9/14 |
| | | | | 296/107.02 |
| 6,877,761 | B2 * | 4/2005 | Hsia | B62B 7/123 |
| | | | | 280/658 |
| 7,118,173 | B2 * | 10/2006 | Kassai | B62B 9/14 |
| | | | | 135/133 |
| 8,210,562 | B2 * | 7/2012 | Ohnishi | B62B 9/14 |
| | | | | 280/649 |
| 8,602,442 | B2 * | 12/2013 | Li | B62B 7/062 |
| | | | | 280/647 |
| 9,004,587 | B2 * | 4/2015 | Winterhalter | B62B 9/14 |
| | | | | 297/184.13 |
| 9,215,859 | B2 * | 12/2015 | Jakubowski | B62B 9/26 |
| 9,616,913 | B2 * | 4/2017 | Wang | B62B 9/102 |
| 10,052,981 | B2 * | 8/2018 | Wright | A47C 7/66 |
| 10,787,188 | B2 * | 9/2020 | Popp | B62B 7/064 |
| 11,760,403 | B2 * | 9/2023 | Yoo | B62B 7/068 |
| | | | | 280/638 |
| 11,993,302 | B2 * | 5/2024 | Zheng | B62B 9/20 |
| 12,030,546 | B2 * | 7/2024 | Filipovitz | B60J 1/2011 |
| 2005/0168006 | A1 * | 8/2005 | Darland | B62B 9/14 |
| | | | | 296/97.21 |
| 2008/0185029 | A1 * | 8/2008 | Lake | B62B 7/123 |
| | | | | 135/96 |
| 2009/0096257 | A1 * | 4/2009 | Gordon | B62B 9/142 |
| | | | | 297/184.12 |
| 2020/0172142 | A1 * | 6/2020 | Young | B62B 7/142 |

FOREIGN PATENT DOCUMENTS

| | | |
|---|---|---|
| CN | 208306731 U | 1/2019 |
| CN | 112693516 A | 4/2021 |
| CN | 113212532 A | 8/2021 |
| JP | 4191290 B2 | 12/2008 |
| JP | 2009113600 A | 5/2009 |
| JP | 2014061768 A | 4/2014 |
| TW | 202114892 A | 4/2021 |

OTHER PUBLICATIONS

First Office Action in Corresponding Chinese Application No. 202111305409.0, dated Jul. 5, 2024; 9 pgs.

* cited by examiner

160

CARRIER WITH PROTECTIVE COVER ON CANOPY ROD

CROSS REFERENCE TO RELATED APPLICATION

This application claims priority of Chinese Patent Application No. 202111305409.0, entitled "CARRIER", filed on Nov. 5, 2021, the entire content of which is incorporated herein by reference.

TECHNICAL FIELD

The present application relates to a carrier, in particular to a child stroller.

BACKGROUND

A child stroller is a common infant product which usually includes a frame, wheels and a seat. The frame is used to support and connect parts of other elements. The wheels are located under the frame to provide a travel function of the child stroller, and the seat is installed on the frame so that a child can be sit thereon. The frame includes a handle, and the handle is located at an upper part of the frame for convenience of a guardian holding and pushing the child stroller.

At present, the child stroller is provided with a canopy to provide protection against sunlight, rain, or wind. The canopy is usually disposed above the seat, and set in a folded mode or an unfolded mold. Specifically, a canopy cloth has one end connected to the handle, and the other end connected to a canopy support that can rotate relative to the handle, so as to be folded or unfolded with rotation of the canopy support relative to the handle.

In some applications, the frame itself is designed to be a collapsible form. For example, it may be divided into an upper handle portion and a lower handle portion which can be rotated and collapsed relative to each other. In this way, when the frame is collapsed, the upper handle portion, the lower handle portion, and the canopy support are substantially close to one another, thus reducing the occupied space as much as possible. However, in a collapsed state, the canopy cloth is sandwiched between the canopy support and the handle that are made of relatively hard materials, which may cause the canopy cloth to be worn out after the child stroller is frequently folded.

As shown in FIGS. 1-4, the conventional child stroller includes an upper handle portion, a lower handle portion, a canopy support, and a canopy cloth. A lower end of the upper handle portion is connected to an upper end of the lower handle portion, the upper handle portion is connected to the lower handle portion through a second rotatable joint, such that the upper handle portion can be pivoted between an unfolded position relative to the lower handle portion and a collapsed position where the upper handle portion is located closer to the lower handle portion. In the unfolded position, the upper handle portion and the lower handle portion are arranged approximately along a straight line and extend in opposite directions from the second rotatable joint.

The canopy support is pivotally connected to the lower end of the upper handle portion, and more specifically, the canopy support is connected to the upper handle portion through a first rotatable joint, such that it can be pivoted between the unfolded position and the folded position. In the unfolded position, the canopy support and the upper handle portion form an angle therebetween, and in the folded position, the canopy support is close to the upper handle portion.

When the entire child stroller is collapsed, the canopy support is rotated to a folded position in which it is close to the upper handle portion, and the upper handle portion is rotated to a collapsed position in which it is close to the lower handle portion, as shown in FIG. 3. At this time, the canopy support is basically sandwiched between the upper handle portion and the lower handle portion. Since the canopy cloth is directly sleeved on the canopy support, the canopy cloth is subjected to a certain friction and shear force at the position where the canopy support contacts the lower handle portion. Since the canopy support and the lower handle portion are usually made of a hard material, such as a metal or hard plastic, it is likely and easily for the canopy cloth to be damaged in use.

Therefore, it is necessary to provide a new child stroller, in which the canopy cloth can be protected from being easily worn and damaged.

SUMMARY

A carrier according to the present disclosure is provided. The carrier includes a frame, and the frame includes: a lower handle portion and an upper handle portion, forming parts of the frame, wherein a lower end of the upper handle portion is connected to an upper end of the lower handle portion, such that the upper handle portion is pivotable between an unfolded position relative to the lower handle portion and a collapsed position where the upper handle portion is close to the lower handle portion; a canopy rod, pivotally connected to the upper handle portion, and being pivotable between an unfolded position and a folded position; and a protective cover, sleeved on the canopy rod, and when the canopy rod is in the folded position, the protective cover is located between the canopy rod and the lower handle portion.

In an embodiment, the canopy rod is connected to the upper handle portion through a first rotatable joint, and the upper handle portion is connected to the lower handle portion through a second rotatable joint.

In an embodiment, the canopy rod includes two longitudinal portions and one transverse portion, one end of each of the two longitudinal portions is pivotally connected to a corresponding lower end of the upper handle portion, and the transverse portion is set up between the two longitudinal portions and forms a free rotating end of the canopy rod, and when the protective cover is fixedly sleeved on the longitudinal portions, and is located at an overlapping position of the longitudinal portion and the lower handle portion when the upper handle portion is close to the lower handle portion.

In an embodiment, a number of the protective cover is two, and the two protective covers are respectively sleeved on the two longitudinal portions.

In an embodiment, a mark point is disposed on at least one of the longitudinal portions for indicating a position where one end of the protective cover is to be placed.

In an embodiment, the protective cover is made of an elastic material, the protective cover is in a cylindrical shape in a natural state, and is deformable according to a section shape of the canopy rod when the protective cover is sleeved on the canopy rod.

In an embodiment, the carrier further comprises a canopy cloth covering the canopy rod and the protective cover from outside.

In an embodiment, the carrier further comprises an auxiliary rod pivotally connected between a corresponding lower end of the upper handle portion and the canopy rod through the first rotatable joint, wherein the auxiliary rod is pivotable between the unfolded position where the canopy rod and the upper handle portion form an angle and the folded position where the canopy rod is close to the upper handle portion; and a corresponding position in middle region of the canopy cloth is fixedly connected to the auxiliary rod, such that the canopy cloth is supported by the auxiliary rod while the canopy cloth is unfolded.

In an embodiment, the protective cover is in a cylindrical shape, and the canopy rod has a substantially flat cross-section, and a long side of the cross-section is perpendicular to a rotation axis of the first rotatable joint.

In an embodiment, the carrier is a child stroller.

A carrier according to the present disclosure is provided. The carrier includes a frame, and the frame includes; a lower handle portion and an upper handle portion, forming part of the frame, wherein a lower end of the upper handle portion is connected to an upper end of the lower handle portion, such that the upper handle portion is pivotable between a unfolded position relative to the lower handle portion and a collapsed position where being close to the lower handle portion; a canopy rod, pivotally connected to the lower end of the upper handle portion, and being pivotable between an unfolded position and a folded position a canopy cloth, covering the canopy rod from outside; and a flexible attachment, adhered to an inner side of the canopy cloth and arranged at a position corresponding to a position where the canopy cloth contacts the lower handle portion when the upper handle portion is pivoted to the collapsed position.

In an embodiment, the canopy cloth has a double-layer structure, the flexible attachment is filled in the double-layer structure, and the flexible attachment surrounds lower, left and right sides of the canopy rod.

In an embodiment, the canopy rod is connected to the upper handle portion through a first rotatable joint, and the upper handle portion is connected to the lower handle portion through a second rotatable joint.

In an embodiment, the canopy rod includes two longitudinal portions and one transverse portion, one end of each of the two longitudinal portions is pivotally connected to a corresponding lower end of the upper handle portion, and the transverse portion is set up between the two longitudinal portions and forms a free rotating end of the canopy rod. The flexible attachment is sleeved on the longitudinal portions, and is located at an overlapping position of the longitudinal portion and the lower handle portion when the upper handle portion is close to the lower handle portion.

In an embodiment, a number of the flexible attachment is two, and the two flexible attachment are respectively sleeved on the two longitudinal portions.

In an embodiment, the carrier further comprises an auxiliary rod pivotally connected between a corresponding lower end of the upper handle portion and the canopy rod through the first rotatable joint, wherein the auxiliary rod is pivotable between the unfolded position where the canopy rod and the upper handle portion form an angle therebetween and the folded position where to the canopy rod is close to the upper handle portion; and the auxiliary rod is fixedly connected to a corresponding position in middle region of the canopy cloth, such that the canopy cloth is supported by the auxiliary rod while being unfolded.

BRIEF DESCRIPTION OF THE DRAWINGS

The above summary and the following description will be better appreciated and understood with reference to the non-limiting examples shown in the attached drawings, in which.

DETAILED DESCRIPTION

Although the invention is illustrated and described herein with reference to specific embodiments, the invention should not be limited to the illustrated details. Specifically, within the scope of the equivalents of the claims and without departing from the invention, various modifications can be made to these details.

Direction descriptions such as "front," "back," "up" and "down" related herein are only for convenience of understanding. The invention is not limited to these directions, but can be adjusted according to the actual situation.

Reference is made to FIG. 5A to FIG. 7. A child stroller 100 according to a first embodiment of the present disclosure is provided.

Figure 5A:
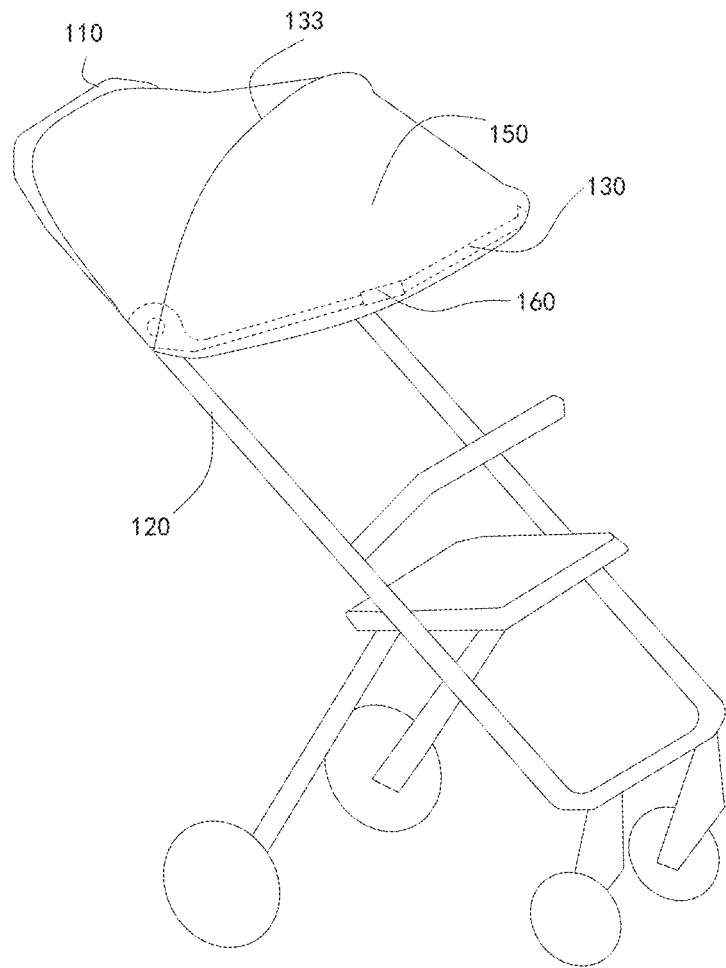
FIG. 5A is a schematic perspective view of a child stroller according to a first embodiment of the present disclosure, which illustrates an upper handle portion, a lower handle portion, a canopy rod, and a protective cover.
Figure 5B:
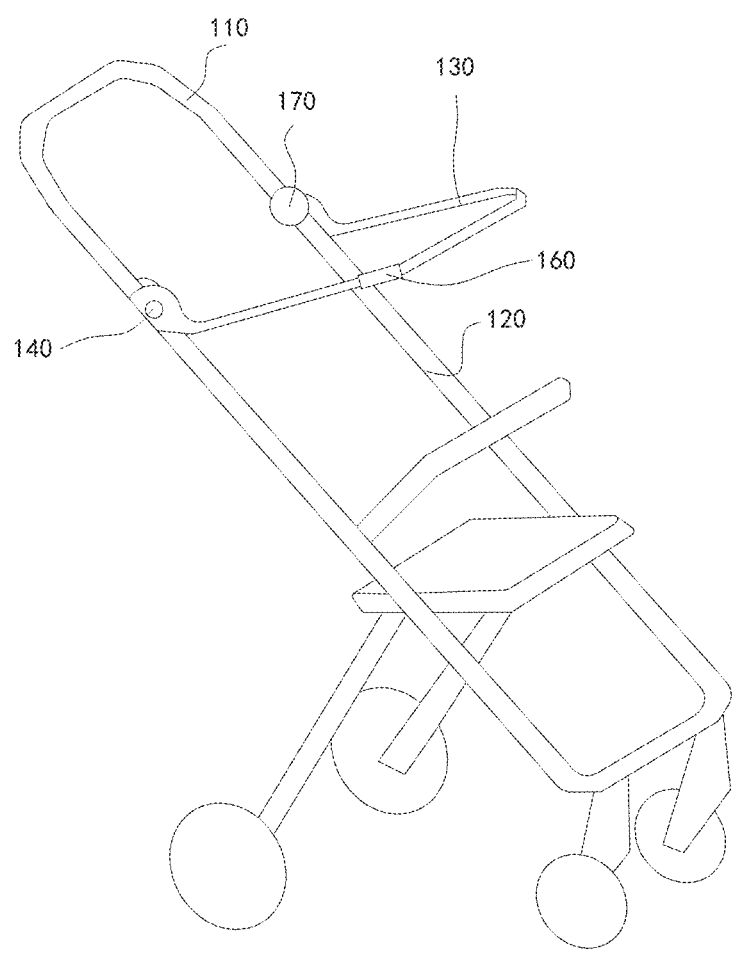
FIG. 5B is a schematic perspective view in which the canopy cloth shown in FIG. 5A is omitted.

As shown in FIG. 5A, a frame of the child stroller 100 includes a lower handle portion 120, an upper handle portion 110, a canopy rod 130, and a canopy cloth 150.

The lower handle portion 120 and the upper handle portion 110 are jointly formed as parts of the frame. A lower end of the upper handle portion 110 is connected to an upper end of the lower handle portion 120, such that the upper handle portion 110 can be pivoted between an unfolded position relative to the lower handle portion 120 and a collapsed position where the upper handle portion is close to the lower handle portion 120.

The canopy rod 130 is pivotally connected to the upper end of the lower handle portion 120, and can be pivoted between an unfolded position and a folded position. In the unfolded position, the canopy rod and the upper handle portion 110 form an angle therebetween, and in the folded position, the canopy rod is close to the upper handle portion 110.

The canopy cloth 150 is connected between the upper handle portion 110 and the canopy rod 130, and can be unfolded and folded as the upper handle portion 110 is pivoted relative to the canopy rod 130.

A protective cover 160 is sleeved on the canopy rod 130. When the canopy rod 130 is in its folded position, the protective cover 160 contacts the lower handle portion 120.

In this embodiment, the canopy rod 130 is connected to the upper handle portion 110 through a first rotatable joint 140, and the upper handle portion 110 is connected to the lower handle portion 120 through a second rotatable joint 170. The first rotatable joint 140 and the second rotatable joint 170 each have a rotation axis along a transverse direction (i.e., a left-right direction of the child stroller 100). The first rotatable joint 140 is close to an outer side of the child stroller 100, and the second rotatable joint 170 is close to an inner side of the child stroller 100. In other embodiments, the first rotatable joint 140 and the second rotatable joint 170 can be the same component. That is, the lower handle portion 120, the upper handle portion 110, and the canopy rod 130 can rotate around the same rotation axis.

In some embodiments, the child stroller 100 may further include an auxiliary rod 133. The auxiliary rod 133 is pivotally connected between a corresponding lower end of the upper handle portion 110 and the canopy rod 130 through the first rotatable joint 140, and can be pivoted between the unfolded position where the canopy rod 130 and the upper handle portion 110 form the angle therebetween and the folded position where the canopy rod is close to the upper handle portion 110. A corresponding position in middle region of the canopy cloth 150 is fixedly connected to the auxiliary rod 133, such that the canopy cloth 150 is supported by the auxiliary rod 133 when the canopy cloth 150 is unfolded. One or more auxiliary rods 133 may be provided to support the canopy cloth 150 according to actual requirements.

In this embodiment, the canopy rod 130 includes two longitudinal portions 131 and one transverse portion 132. One end of each of the two longitudinal portions 131 is pivotally connected to one corresponding lower end of the upper handle portion 110. The transverse portion 132 is set up between the two longitudinal portions 131 and forms a free rotating end of the canopy rod 130. In other embodiments, numbers of the longitudinal portion 131 and the transverse portion 132 can be set according to the form of the canopy cloth 150.

Figure 6:
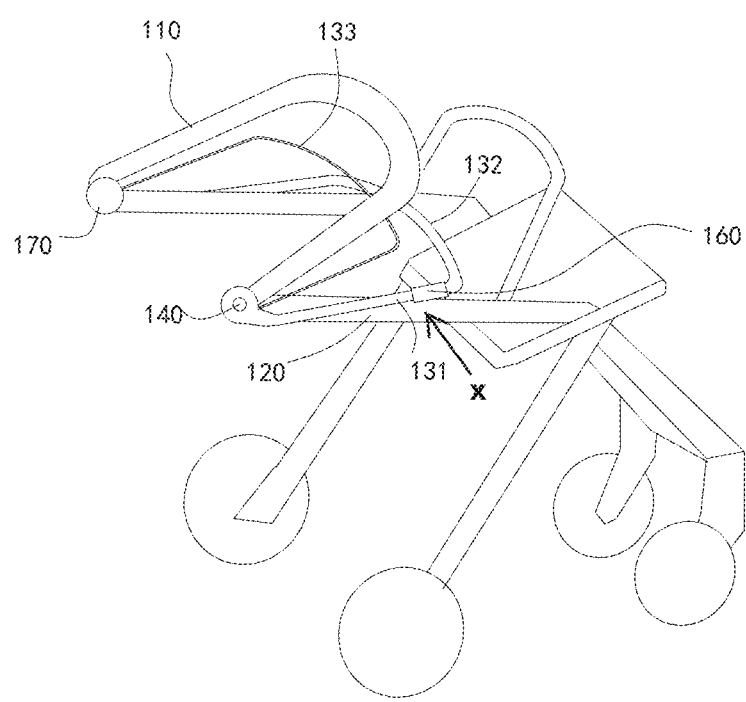
FIG. 6 is a schematic perspective view of the child stroller according to the present disclosure, in which the upper handle portion is close to its collapsed position, and the canopy rod is close to its folded position.

The protective cover 160 is fixedly sleeved on the corresponding one of the longitudinal portions 131 of the canopy rod 130. When the upper handle portion 110 is close to the lower handle portion 120, the protective cover 16 is arranged at an overlapping position X (as seen in FIG. 6) between the corresponding one of the longitudinal portions 131 and the lower handle portion 120.

In the situation where the canopy rod 130 includes two longitudinal portions 131, two protective covers 160 may be provided to be sleeved on the two longitudinal portions 131, respectively.

A mark point 134 may be disposed on one or both of the longitudinal portions 131 of the canopy rod 130 for indicating the position where one end of the protective cover 160 is to be placed. Specifically, the mark point 134 may be a colored point located at an outer side of at least one of the longitudinal portions 131, so as to be observed by the user. When the protective cover 160 is arranged at its preset position, the mark point 134 should be located at one end of the protective cover 160, for example, at one end of the protective cover 160 facing the upper handle portion 110 and the lower handle portion 120. In this way, the user can clearly know whether the protective cover 160 has been arranged in the preset position.

Figure 8:
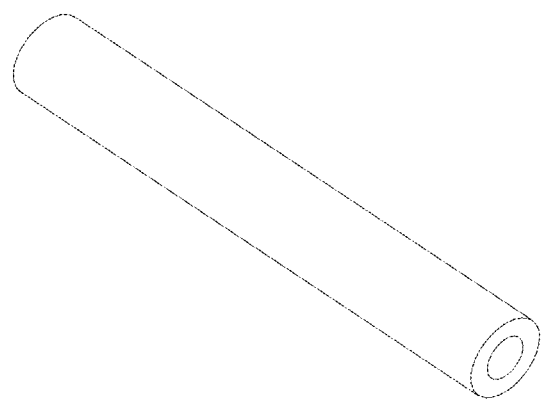
FIG. 8 is a schematic perspective view of the protective cover according to an embodiment of the present disclosure.
Figure 9:
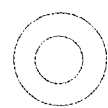
FIG. 9 is a schematic view showing an end of the protective cover.
Figure 10:
FIG. 10 is a schematic side view of the protective cover.

The protective cover 160 is made of an elastic material, which is in a cylindrical shape in the natural state (as shown in FIGS. 8 and 9). When the protective cover 160 is sleeved on the canopy rod 130 a shape of the protective cover 160 can be changed according to a sectional shape of the canopy rod 130.

Figure 7:
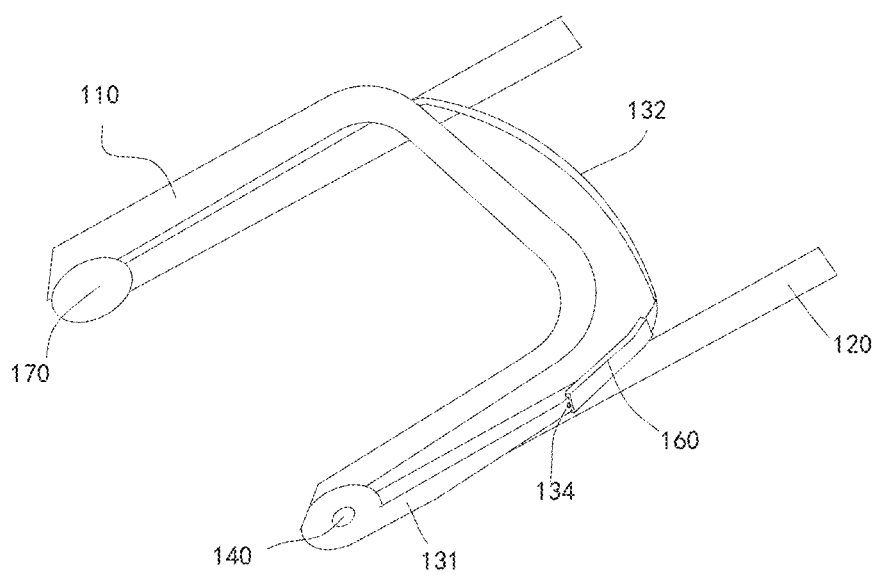
FIG. 7 is a schematic perspective view of the upper handle portion, the lower handle portion, the canopy rod, and the protective cover of the child stroller according to the present disclosure.

In the present disclosure, the protective cover 160 is in a cylindrical shape, and the canopy rod 130 has a substantially flat cross-section, and a long side of the cross-section is perpendicular to the rotation axis of the first rotatable joint 140. When the protective cover 160 is sleeved on the canopy rod 130, the protective cover 160 is deformed into a rectangular shape to be consistent with the shape of the canopy rod 130. In other embodiments, the protective cover 160 can also be designed to be consistent with the cross-sectional shape of the canopy rod 130, such as having a rectangular section. Referring to FIG. 7, the protective cover 160 in the rectangular shape is shown.

Figure 1:
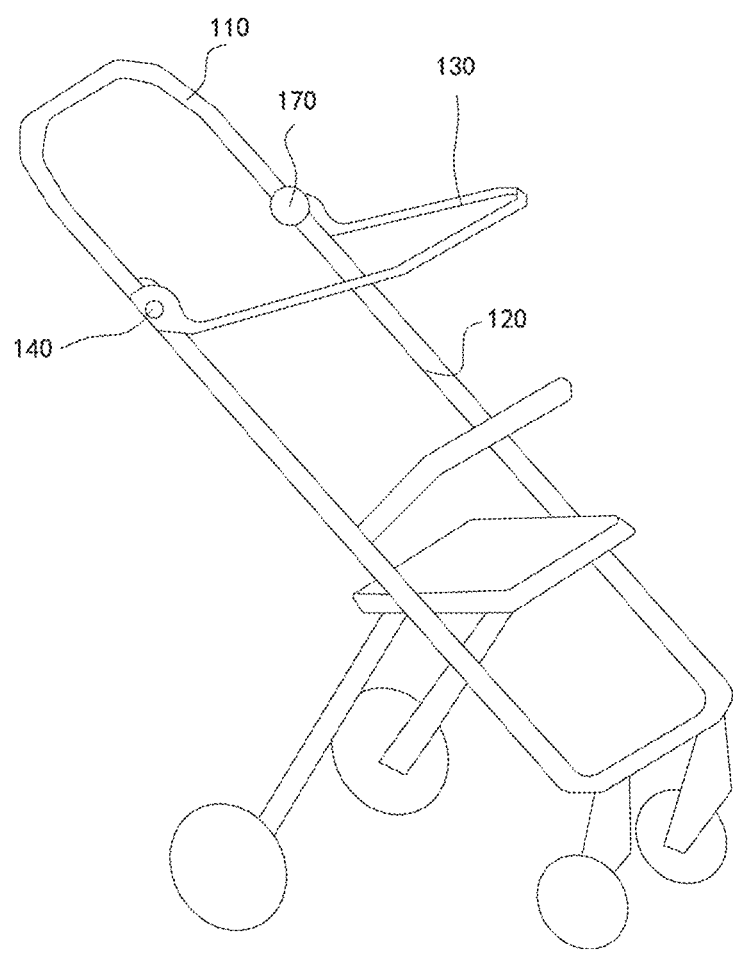
FIG. 1 is a schematic perspective view of a conventional child stroller according to the prior art, in which an upper handle portion, a lower handle portion and a canopy support are shown, but a canopy cloth is omitted.
Figure 2:
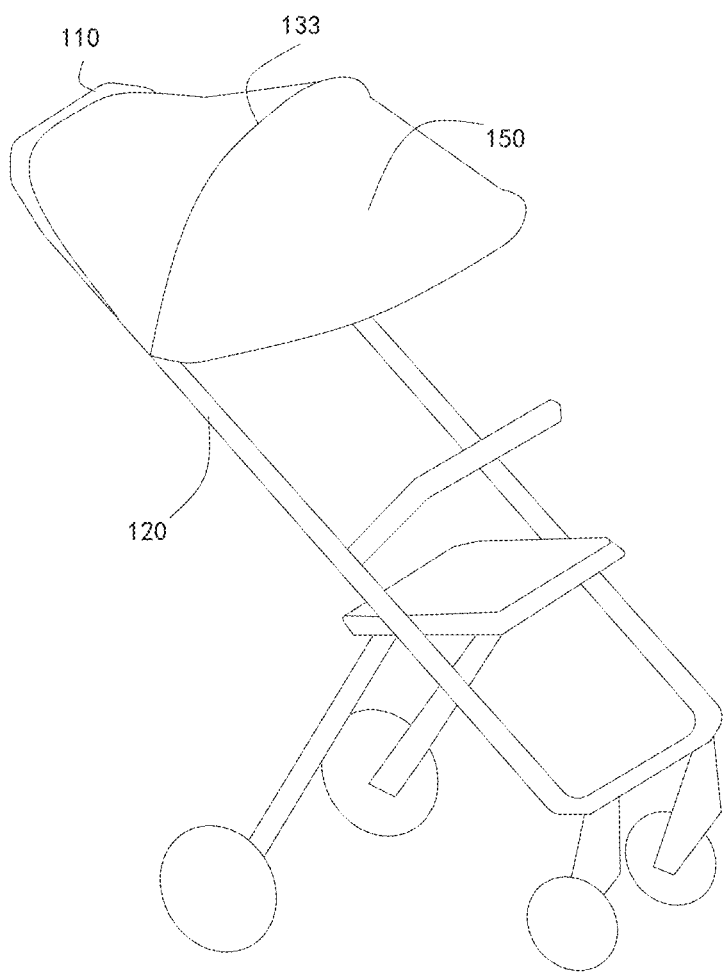
FIG. 2 is a schematic perspective view of the conventional child stroller according to the prior art, in which the upper handle portion, the lower handle portion and the canopy cloth covering the canopy support are shown.
Figure 3:
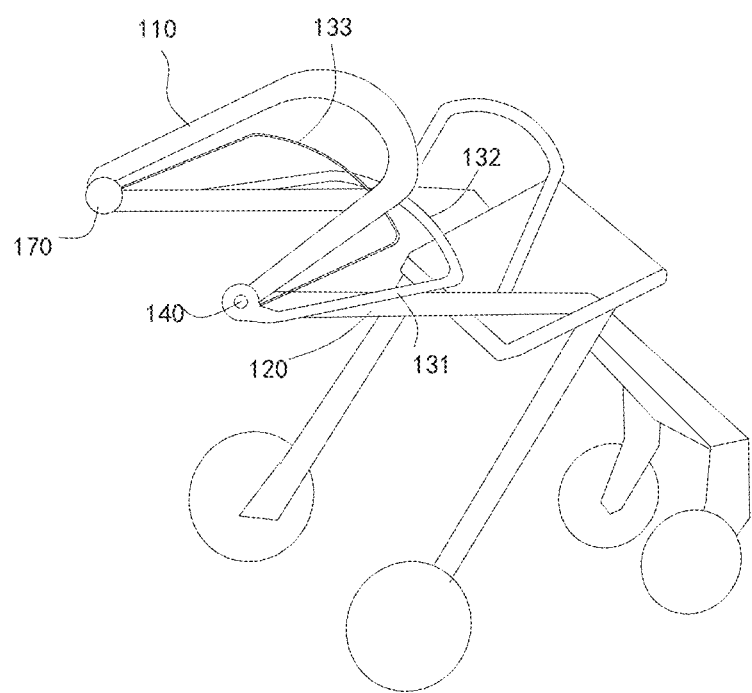
FIG. 3 is a schematic perspective view of the conventional child stroller according to the prior art, in which the upper handle portion is close to its collapsed position, and the canopy support is close to its folded position.
Figure 4:
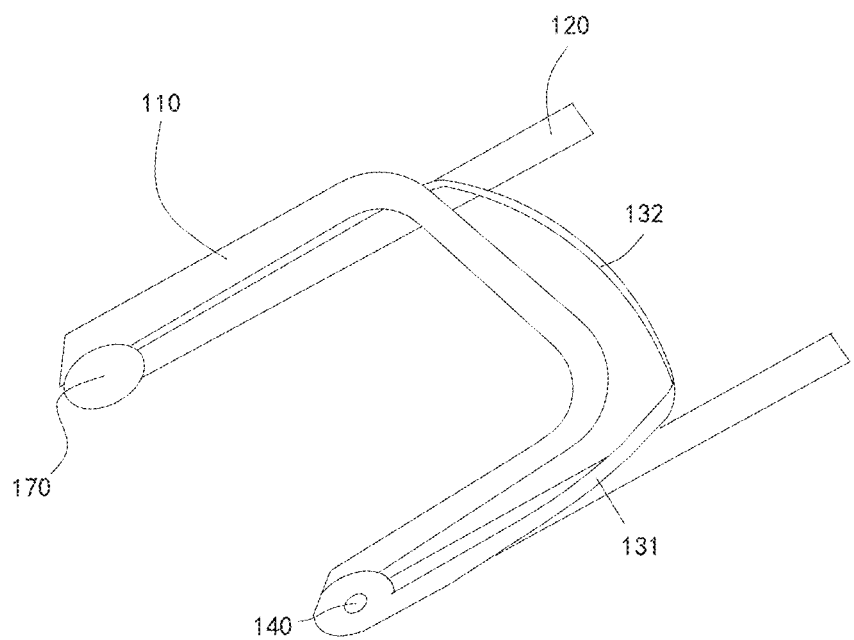
FIG. 4 is a partially enlarged schematic view of the upper handle portion, the lower handle portion, and the canopy support shown in FIG. 3 and viewed from another angle.
Figure 11A:
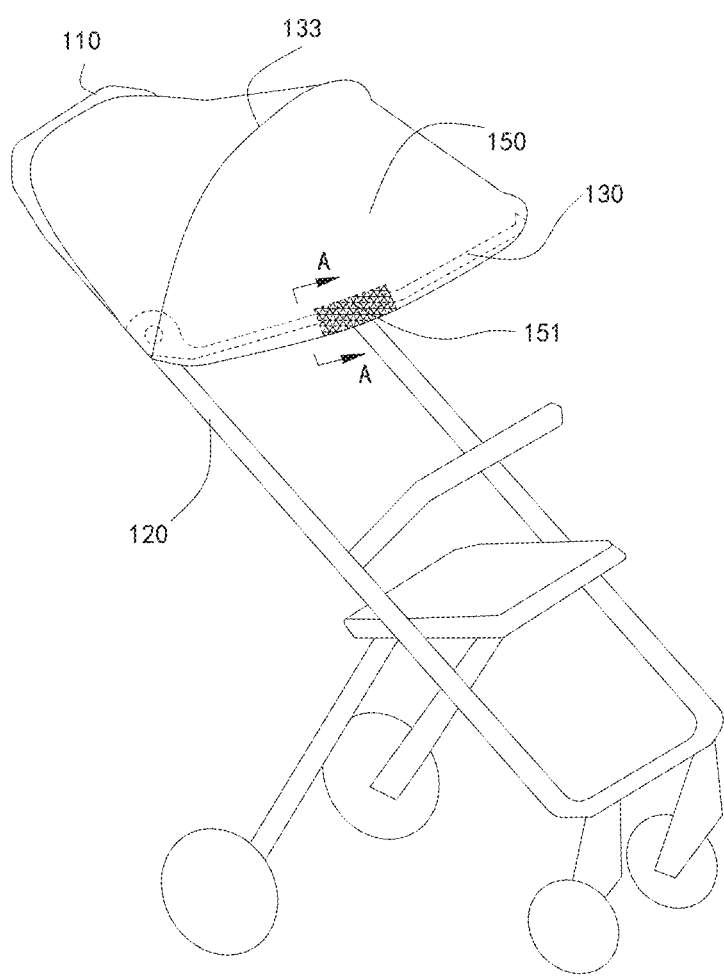
FIG. 11A is a schematic perspective view of the child stroller according to a second embodiment of the present disclosure.
Figure 11B:
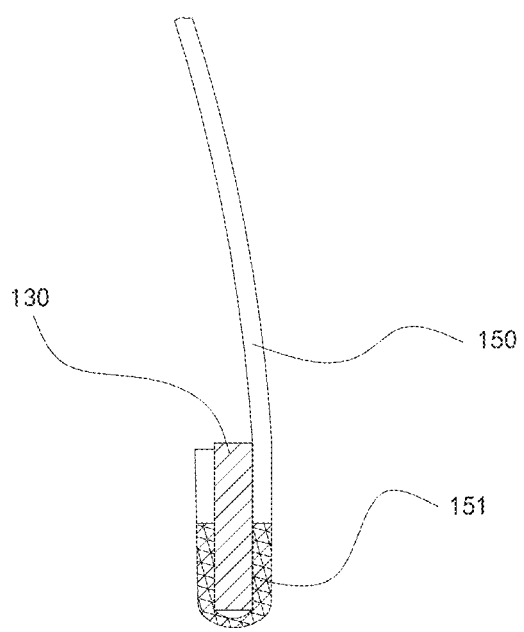
FIG. 11B is a partially sectional view taken along line A-A in FIG. 11A.

Reference is made to FIGS. 11A-11B. A child stroller of a second embodiment according to the present disclosure will be described. In this embodiment, instead of disposing a protective cover on the canopy rod 130, a flexible attachment 151 is disposed in the canopy cloth 150. More specifically, the flexible attachment 151 is adhered to the inner side of the canopy cloth 150, and the position of the flexible attachment 151 is arranged to correspond to a position at which the canopy rod 130 is in contact with the lower handle portion 120 when the upper handle portion 110 is pivoted to the collapsed position (i.e., the upper handle portion 110 is close to the lower handle portion 120, and the canopy rod 130 is also close to the lower handle portion 120, similar to the state shown in FIG. 4). That is, the protective cover 160 is replaced by the flexible attachment 151 to buffer a collision between the canopy rod 130 and the lower handle portion 120. According to another embodiment, two flexible attachments 151 are provided, and the two flexible attachments 151 are respectively sleeved on two longitudinal portions 131 of the canopy rod 130.

In an embodiment, the canopy cloth 150 has a double-layer structure, and the flexible attachment 151 is filled in the double-layer structure (see FIG. 11B). the flexible attachment 151 can surround the lower, left and right sides of the canopy rod 130, so as to form a stable buffer structure. The flexible attachment 151 may be made of a flexible material such as a foam cotton.

In the embodiments of the present disclosure, a carrier is described by taking a child stroller as an example. It should be understood that the carrier of the present disclosure is not limited to a child stroller, and can also be any carrier with a sunshade.

Although the present disclosure has been illustrated and described with reference to typical embodiments, the terms used are illustrative and exemplary, not restrictive. Since the present disclosure can be specifically implemented in various forms without departing from the spirit and essence of the present disclosure, it should be understood that the above embodiments are not limited to any of the foregoing details, but should be interpreted as broadly as possible within the scope defined in the claims, so all changes falling within the scope of claims or their equivalents should be covered by claims.

LIST OF REFERENCE SIGNS

100 Child stroller
110 Upper Handle portion
120 Lower Handle portion
130 Canopy Rod
   131 Longitudinal Portion
   132 Transverse Portion
   133 Auxiliary Rod
   134 Mark Point
140 First Rotatable Joint
150 Canopy cloth
   151 Flexible Attachment
160 Protective Cover
170 Second Rotatable Joint

What is claimed is:

1. A carrier comprising a frame, wherein the frame includes:
a lower handle portion and an upper handle portion, wherein a lower end of the upper handle portion is connected to an upper end of the lower handle portion, such that the upper handle portion is pivotable between an unfolded position where the upper handle portion is unfolded relative to the lower handle portion and a collapsed position where the upper handle portion is folded toward the lower handle portion;
a canopy rod, pivotally connected to the upper handle portion, and being pivotable between an unfolded position and a folded position; and
a protective cover, undetachably sleeved on the canopy rod, and when the canopy rod is in the folded position, the protective cover is located between the canopy rod and the lower handle portion.

2. The carrier according to claim 1, wherein:
the canopy rod is connected to the upper handle portion through a first rotatable joint, and
the upper handle portion is connected to the lower handle portion through a second rotatable joint.

3. The carrier according to claim 1, wherein:
the canopy rod is rotatable and includes two longitudinal portions and one transverse portion, one end of each of the two longitudinal portions is pivotally connected to a corresponding lower end of the upper handle portion, and the transverse portion is between the two longitudinal portions and forms a free end of the canopy rod, and
the protective cover is fixedly sleeved on the longitudinal portions, and is located at an overlapping position of the longitudinal portion and the lower handle portion when the upper handle portion is folded toward the lower handle portion at the collapsed position.

4. The carrier according to claim 3, wherein:
a number of the protective cover is two, and the two protective covers are respectively sleeved on the two longitudinal portions.

5. The carrier according to claim 3, wherein:
a mark point is disposed on at least one of the longitudinal portions for indicating a position where one end of the protective cover is to be placed.

6. The carrier according to claim 1, wherein:
the protective cover is made of an elastic material, the protective cover is in a cylindrical shape in a natural state, and is deformable according to a section shape of the canopy rod when the protective cover is sleeved on the canopy rod.

7. The carrier according to claim 2, further comprising a canopy cloth covering the canopy rod and the protective cover from outside.

8. The carrier according to claim 7, further comprising an auxiliary rod pivotally connected between a corresponding lower end of the upper handle portion and the canopy rod through the first rotatable joint, wherein
the auxiliary rod is pivotable between the unfolded position where the canopy rod and the upper handle portion form a first angle and the folded position where the canopy rod and the upper handle portion form a second angle smaller than the first angle; and
a corresponding position in middle region of the canopy cloth is fixedly connected to the auxiliary rod, such that the canopy cloth is supported by the auxiliary rod while the canopy cloth is unfolded.

9. The carrier according to claim 2, wherein:
the protective cover is in a cylindrical shape, and the canopy rod has a substantially flat cross-section, and a long side of the cross-section is perpendicular to a rotation axis of the first rotatable joint.

10. The carrier according to claim 1, wherein:
the carrier is a child stroller.

* * * * *